Patented Sept. 15, 1931

1,822,934

UNITED STATES PATENT OFFICE

PAUL I. MURRILL, OF PLAINFIELD, NEW JERSEY, ASSIGNOR TO R. T. VANDERBILT COMPANY, INC., OF NEW YORK, N. Y., A CORPORATION OF NEW YORK

STABILIZATION OF FATTY ACIDS AND THEIR DERIVATIVES

No Drawing. Application filed August 7, 1928. Serial No. 298,134.

This invention relates to improvements in the stabilization of fatty acids and their derivatives, such as soaps and fatty acid esters (e. g. animal and vegetable oils) which are liable to undergo oxidation and become rancid under the influence of air and light.

According to the present invention there is incorporated with the fatty acid or fatty acid derivative a small amount of a stabilizing material which imparts thereto increased stability and resistance to oxidation and rancidity. The stabilizing agents, which are added according to the present invention, are alkylolamines such as diethanolamine $(OH.CH_2.CH_2)_2.NH$ and triethanolamine $(OH.CH_2.CH_2)_3.N$, or mixtures thereof, etc., which may be represented by the general formula $N.(ROH)_x.H_{3-x}$, where R stands for an alkylene group and the OH is attached to a carbon other than that to which N is attached. A mixture of such compounds or their derivatives may be used. These stabilizers impart to the fatty acid or fatty acid derivatives improved resistance to oxidation and rancidity even though present in only small amounts.

The stabilizing ingredient or ingredients may be added to the fatty acid or fatty acid derivative directly or, where the stabilizing ingredient is crystalline, it may first be dissolved in a suitable solvent and added to the material to be stabilized in this way. The solvent may later be volatilized and thus removed from the material where this is desirable. The stabilizing ingredient may be added as the anhydrous base, the hydrated base, or as a salt in combination with an acid such as benzoic acid, stearic acid or oleic acid.

The amount of the stabilizing material which it is necessary to add is small. In general, a fraction of a per cent, such as two tenths or three tenths of a per cent will suffice.

The following examples further illustrate the invention:

Olive oil is stabilized by the addition of about 0.3% of a product made up of about 75% triethanolamine and 25% diethanolamine. The oil stabilized in this manner is more resistant to oxidation and less liable to become rancid than oil to which no stabilizer has been added.

Cotton oil, corn oil and tallow can be stabilized in a similar manner.

If the product which contains about 75% triethanolamine and 25% diethanolamine is brought into reaction with stearic acid and the stearate formed is added to olive oil or cotton seed oil in such an amount that the final product contains .2% of the alkylolamine, soap made from these oils will be more resistant to oxidation and less liable to become rancid than soap made from similar oils not so stabilized.

Instead of adding the stabilizer to the animal or vegetable oil which constitutes the soap stock, it may be added to the soap formed by saponifying this stock.

In the attached claims the expression "fatty acid compound" is used to include fatty acids and derivatives such as fatty acid esters (i. e. animal and vegetable oils) and soaps.

I claim:

1. A stabilized composition comprising a chemical compound containing a fatty acid radical and a small amount of a compound having the formula $N.(ROH)_x.H_{3-x}$, where R is an alkylene group and the OH is attached to a carbon other than that to which N is attached.

2. A stabilized fatty acid compound, which comprises in addition to the fatty acid compound a stabilizer having the general formula $N.(ROH)_x.H_{3-x}$, where R is an alkylene group and the OH is attached to a carbon other than that to which the N is attached.

3. A stabilized fatty acid compound comprising in addition to the fatty acid compound a stabilizer from the group consisting of the alkylolamines and their derivatives.

4. A stabilized fatty acid compound comprising in addition to the fatty acid compound a small amount of triethanolamine.

5. A stabilized fatty oil comprising, in addition to the oil, a small amount of a stabilizer from the group consisting of the alkylolamines and derivatives thereof.

6. A fatty oil containing a small amount of a stabilizer from the group consisting of triethanolamine and diethanolamine and derivatives thereof.

7. A stabilized fatty oil containing a small amount of an alkylolamine salt as the stabilizer.

8. A stabilized soap containing in addition to the soap a compound from the group consisting of the alkylolamines and derivatives thereof.

9. A stabilized soap containing in addition to the soap a stabilizer from the group consisting of triethanolamine and diethanolamine and salts thereof.

10. A stabilized soap containing in addition to the soap a small amount of triethanolamine stearate.

In testimony whereof I affix my signature.

PAUL I. MURRILL.